United States Patent
Hale et al.

(10) Patent No.: US 12,435,255 B2
(45) Date of Patent: Oct. 7, 2025

(54) EUTECTIC METAL ALLOY IN DRILLING FLUIDS AND METHODS OF USE THEREOF

(71) Applicant: ARAMCO SERVICES COMPANY, Houston, TX (US)

(72) Inventors: Arthur Herman Hale, Angleton, TX (US); Ashok Santra, The Woodlands, TX (US); Ahmed Said Abdelaziz Amer, Katy, TX (US)

(73) Assignees: SAUDI ARABIAN OIL COMPANY, Dhahran (SA); NEWPARK DRILLING FLUIDS, LLC, Katy, TX (US)

( * ) Notice: Subject to any disclaimer, the term of this patent is extended or adjusted under 35 U.S.C. 154(b) by 4 days.

(21) Appl. No.: 18/456,461

(22) Filed: Aug. 25, 2023

(65) Prior Publication Data

US 2025/0066660 A1      Feb. 27, 2025

(51) Int. Cl.
  *C09K 8/05*       (2006.01)

(52) U.S. Cl.
  CPC ...................................... *C09K 8/05* (2013.01)

(58) Field of Classification Search
  CPC . C09K 8/03; C09K 8/032; C09K 8/04; C09K 8/05; C09K 8/14; C09K 8/145;
  (Continued)

(56) References Cited

U.S. PATENT DOCUMENTS

| 4,191,266 A | 3/1980 | van Eek et al. |
| 6,523,610 B1 * | 2/2003 | Griffith .................. E21B 43/10 166/57 |

(Continued)

FOREIGN PATENT DOCUMENTS

| WO | 2022087002 A1 | 4/2022 |
| WO | 2022099399 A1 | 5/2022 |

OTHER PUBLICATIONS

M. H. Rasool et al., "Potassium carbonate based deep eutectic solvent (DES) as a potential drilling fluid additive in deep water drilling applications." Petroleum Science and Technology, 2021, vol. 39, Issued 15-16, pp. 612-631 (4 pages).

(Continued)

*Primary Examiner* — Angela M DiTrani Leff
(74) *Attorney, Agent, or Firm* — Osha Bergman Watanabe & Burton LLP

(57) ABSTRACT

A fluid composition including a mixed metal oxide viscosifier, a clay viscosifier, and solid eutectic metal alloy particles. A method including pumping a drilling fluid downhole in a wellbore. The drilling fluid including water, a mixed metal oxide viscosifier, a clay viscosifier, and solid eutectic metal alloy particles. The method further including allowing the drilling fluid to reach a target zone with elevated permeability and forming a filter cake containing solid eutectic metal alloy particles in the target zone. The method including heating the filter cake to a temperature greater than the melting temperature of the eutectic metal alloy particles, allowing the particles to melt and become liquid eutectic metal alloy particles. The method including discontinuing heating and allowing the filter cake to cool to (Continued)

a temperature lower than the melting temperature of the solid eutectic metal alloy particles to produce a strengthened filter cake.

18 Claims, 4 Drawing Sheets

(58) Field of Classification Search
CPC . C09K 8/16; C09K 8/50; C09K 8/504; C09K 8/5045; C09K 8/516; E21B 21/00; E21B 21/003; E21B 33/138
See application file for complete search history.

(56) References Cited

U.S. PATENT DOCUMENTS

| | | | |
|---|---|---|---|
| 12,037,870 B1* | 7/2024 | Hale | E21B 36/003 |
| 2013/0126243 A1* | 5/2013 | Smith | C09K 8/206 |
| | | | 175/65 |
| 2013/0206479 A1* | 8/2013 | Smith | C09K 8/206 |
| | | | 507/140 |
| 2014/0060843 A1* | 3/2014 | Murphy | C09K 8/516 |
| | | | 507/104 |
| 2015/0166870 A1* | 6/2015 | Jain | C09K 8/516 |
| | | | 166/305.1 |
| 2015/0218432 A1 | 8/2015 | Quintero et al. | |
| 2016/0145486 A1* | 5/2016 | Weaver | C09K 8/40 |
| | | | 507/260 |
| 2016/0153273 A1* | 6/2016 | Nguyen | C09K 8/5758 |
| | | | 166/243 |
| 2016/0237341 A1 | 8/2016 | Bhamidipati et al. | |
| 2018/0086961 A1 | 3/2018 | Weaver et al. | |
| 2021/0071058 A1 | 3/2021 | Stoian et al. | |
| 2021/0222047 A1 | 7/2021 | Pearl, Jr. et al. | |
| 2021/0222513 A1 | 7/2021 | Pearl, Jr. et al. | |
| 2022/0049145 A1 | 2/2022 | Patel et al. | |

OTHER PUBLICATIONS

H. Jia et al., "nvestigation for the novel use of a typical deep eutectic solvent as a potential shale inhibitor", Energy Sources, Part A: Recovery, Utilization, and Environmental Effects, 2022, vol. 44, No. 1, pp. 1402-1415 (8 pages).

J. Ma et al. "Novel environmentally friendly lubricants for drilling fluids applied in shale formation", Energy & Fuels, 2021, vol. 35, No. 9, pp. 8153-8162 (3 pages).

Carpenter, R.B. et al., "Alloy annular plugs effective for casing annular gas flow remediation sustained casing pressure potential threat," Offshore, vol. 62, No. 3, pp. 1-3, Mar. 1, 2002 (3 pages).

Carpenter, R.B. et al., "IADC/SPE 87198: Remediating Sustained Casing Pressure by Forming a Downhole Annular Seal with Low-Melt-Point Eutectic Metal," Society of Petroleum Engineers, pp. 1-15, Mar. 2-4, 2024 (15 pages).

International Search Report issued in corresponding International Application No. PCT/US2024/043324; mailed Dec. 5, 2024 (6 pages).

Written Opinion of the International Searching Authority issued in corresponding International Application No. PCT/US2024/043324; dated Dec. 5, 2024 (9 pages).

* cited by examiner

EUTECTIC METAL ALLOY IN DRILLING FLUIDS AND METHODS OF USE THEREOF

BACKGROUND

When drilling with either a water-based or non-aqueous based drilling fluid across a permeable zone, it is important to form an effective low permeability barrier across the more permeable zone. This permeable zone can be at a sand/shale interval, rubble zone created by moving salt, a fractured interval, or a permeable zone of sand. Accordingly, formulations and processes that are capable of reducing permeability in permeable zones or help to support the wellbore and reduce lost circulation or wellbore instability may be able to improve oil and gas drilling, production, or both.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fluid composition including a mixed metal oxide viscosifier, a clay viscosifier, and solid eutectic metal alloy particles. In another aspect, embodiments disclosed herein relate to a method including pumping a drilling fluid downhole in a wellbore. The drilling fluid includes water, a mixed metal oxide viscosifier, a clay viscosifier, and solid eutectic metal alloy particles. The drilling fluid reaches a target zone with elevated permeability and forms a filter cake containing solid eutectic metal alloy particles in the target zone. The filter cake is heated to a temperature greater than the melting temperature of the eutectic metal alloy particles, allowing the particles to melt and become liquid eutectic metal alloy particles. The heating is discontinued and the filter cake is cooled to a temperature lower than the melting temperature of the solid eutectic metal alloy particles to produce a strengthened filter cake.

Other aspects and advantages of the claimed subject matter will be apparent from the following description and the appended claims.

DETAILED DESCRIPTION

Figure 1:
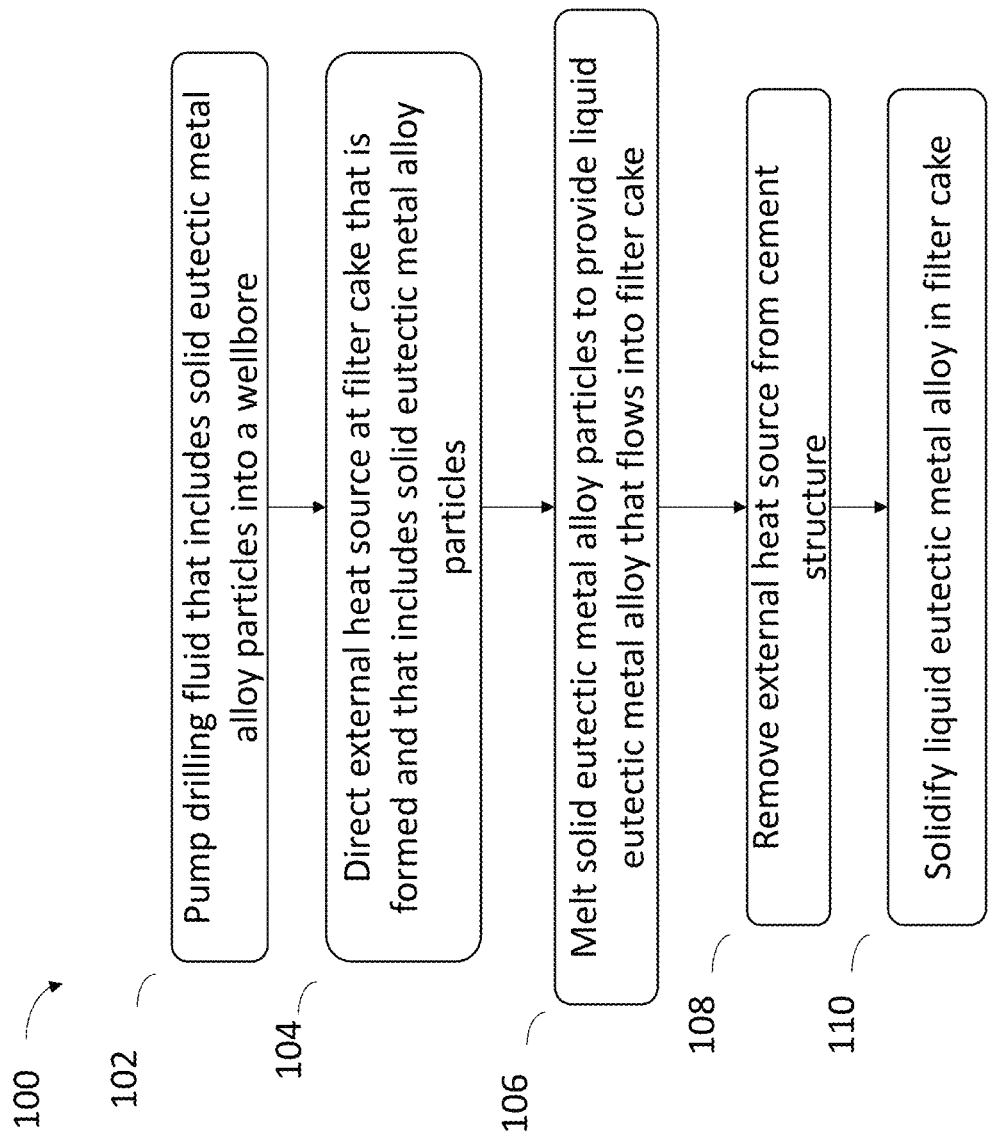
FIG. 1 is a block-flow diagram of a method in accordance with one or more embodiments of the present disclosure.

The present disclosure generally relates to a drilling fluid composition and a method of strengthening or solidifying a filter cake comprising the drilling fluid composition. The drilling fluid composition may include an additive that may form an impermeable structure from a filter cake. Thus, one or more embodiments in accordance with the present disclosure provide an effective solution for preventing nonproductive time by ensuring the formation of impermeable filter cake. In particular, filter cake formed from the drilling fluid material may be strengthened to support the wellbore and prevent lost circulation or wellbore instability.

Drilling Fluid Composition

In one aspect, embodiments disclosed herein relate to a drilling fluid composition. The drilling fluid composition may include an additive capable of strengthening a filter cake formed from drilling fluid material. In one or more embodiments, the additive included in the drilling fluid composition is solid eutectic metal alloy particles. Suitable solid eutectic metal alloy particles may include one or more metals such as lead, tin, bismuth, cadmium, and indium, among others. In particular embodiments, the drilling fluid composition includes eutectic metal alloy particles including tin and bismuth.

Drilling fluid compositions in accordance with one or more embodiments include solid eutectic metal alloy particles in an amount ranging from 50 pounds mass/42 US gallons of fluid (lbm/bbl) to 300 lbm/bbl. For example, in one or more embodiments, the drilling fluid composition may include solid eutectic metal alloy particles in an amount ranging from a lower limit of one of 50, 75, 100, 125, and 150 lbm/bbl to an upper limit of one of 200, 225, and 250 lbm/bbl, where any lower limit may be paired with any mathematically compatible upper limit.

The drilling fluid composition may be a mixed metal formulation, such as a mixed metal oxide formulation which may be capable of suspending high-density particles such as eutectic metal particles. A drilling fluid including mixed metal oxide may comprise water, one or more mixed metal oxide viscosifiers, and one or more clay viscosifiers, and may further include pH agents, lost circulation materials, and anionic suppressant. The water may be in the form of freshwater, brine, or seawater. Mixed metal oxide viscosifiers may include cationic high aspect ratio crystals, such as those based on aluminum oxide and magnesium oxide. Clay viscosifiers suitable for use with mixed metal oxide may include, but are not limited to, bentonite clay, attapulgite clay, and sepolite. The ratio of clay viscosifier to mixed metal oxide viscosifier may be in a range of 2:1 to 20:1 by weight. For example, in one or more embodiments, the ratio of clay viscosifier to mixed metal oxide viscosifier may have a weight to weight ratio ranging from a lower limit of one of 2:1, 4:1, 5:1, 7:1, and 8:1 to an upper limit of one of 10:1, 12:1, 14:1, 15:1, 18:1, and 20:1, where any lower limit may be paired with any mathematically compatible upper limit.

The drilling fluid formulations may further include other components, including viscosifiers, such as polymer viscosifiers, pH adjusting agents, and lost circulation materials.

The drilling fluid formulations may further include one or more pH adjusting agents such as caustic soda, soda ash, and lime. The pH of the drilling fluid may be in a range of 7 to 12. For example, in one or more embodiments, the pH may have a value in a range with a lower limit of any of 8.5, 8.7, 9.0, 9.5, and 10 and an upper limit of any of 11.5, 11.8, and 12 where any lower limit may be paired with any mathematically compatible upper limit. The concentration of the pH adjusting agent may vary depending of the concentration required to achieve the desired pH. For example, the concentration may be in a range with a lower limit of any of 0.2 lbm/bbl, 0.5 lbm/bbl, and 0.8 lbm/bbl, and an upper limit of any of 2 lbm/bbl, 3 lbm/bbl, or 5 lbm/bbl, with any upper limit being compatible with any lower limit.

One or more lost circulation materials may be used. Lost circulation materials are materials added into a drilling fluid that are intended to reduce lost circulation or the amount of drilling fluid that enters into a formation and is not recovered. Lost circulation materials may seal loss zones to reduce fluid loss. In accordance with one or more embodiments, lost circulation materials that may be used in drilling fluid compositions may include, but are not limited to, mineral fiber, inorganic sealants, bridging agents such as calcium carbonate or salt, elastomeric sealants, synthetic fiber, swellable polymer, graphite, and flaky and cellulose fibers. Lost circulation materials may be present in the drilling fluid in a concentration with a lower limit of any of 0.2 lbm/bbl, 0.5 lbm/bbl, 1 lbm/bbl, 2 lbm/bbl, 10 lbm/bbl, or 20 lbm/bbl, and an upper limit of any of 5 lbm/bbl, 10 lbm/bbl, 20 lbm/bbl, 50 lbm/bbl, or 200 lbm/bbl, with any lower limit being combinable with any compatible upper limit As described above, the eutectic metal alloy particles are included in the drilling fluid as an additive capable of bonding, strengthening, or both, a filter cake comprising drilling fluid material. The eutectic metal alloy particles may initially be solid upon pumping into a wellbore. A filter cake is formed from the drilling fluid components in the wellbore. Upon the application of heat, the eutectic metal alloy particles may act as a bonding or strengthening additive by melting in the filter cake, and subsequently cooling to solidify the eutectic metal alloy to provide a reinforced drilling fluid structure. Accordingly, the solid eutectic metal alloy particles may be in solid form at certain downhole temperatures, when the downhole temperature is less than the melting point of the eutectic metal alloy. Suitable solid eutectic metal alloy particles may have a melting point ranging from 45 to 280° C. For example, in one or more embodiments, the drilling fluid composition may include eutectic metal alloy particles having a melting point ranging from a lower limit of one of 45, 50, 75, 100, 120, and 150° C. to an upper limit of one of 160, 180, 200, 220, 240, 260, and 280° C., where any lower limit may be paired with any mathematically compatible upper limit. In some embodiments, the eutectic metal alloy particles have a melting temperature ranging from 70 to 280° C.

The solid eutectic metal alloy particles included in a drilling fluid composition in accordance with the present disclosure may have an average particle size ranging from 50 to 1,000 microns. For example, in one or more embodiments, the solid eutectic metal alloy particles have an average particle size ranging from a lower limit of one of 1 nanometer, 100 nanometers, 500 nanometers, 50 microns, 100 microns, 200 microns, 300 microns, 400 microns, and 500 microns to an upper limit of one of 100, 200, 300, 400, 500, 600, 700, 800, 900, and 1,500 microns, where any lower limit may be paired with any mathematically compatible upper limit.

In one or more embodiments, the drilling fluid composition includes various other additives. Suitable additives that may be included in drilling fluid composition according to the present disclosure include, but are not limited to anionic suppressants, shale inhibitors, polymer viscosifiers, fluid loss agents, and weighted material (barite, hematite, ilmenite calcium carbonate). Such additives may be present in the drilling fluid composition in an amount ranging from a lower limit of one of 0.2, 0.5, 1, 2, 10, and 20 lbm/bbl to an upper limit of one of 5, 10, 30, 50, and 400 lbm/bbl, where any lower limit may be paired with any mathematically compatible upper limit.

The components of the drilling fluid composition may be combined in any order. For example, according to one or more embodiments, the mixed metal oxide viscosifier may be admixed with the water prior to admixture with the solid eutectic metal alloy particles.

Method of Permeability Reduction

In another aspect, embodiments disclosed herein relate to a method of reducing permeability in a wellbore via bonding or strengthening filter cake comprising drilling fluid, such as filter cake formed in oil wells during drilling. The method may include pumping a drilling fluid comprising solid eutectic metal alloy particles downhole in a wellbore and allowing the drilling fluid to reach a target zone, or an area of elevated permeability. A filter cake is formed in the target zone that comprises the solid eutectic metal alloy particles. The filter cake is heated to a temperature sufficient to melt the solid eutectic metal alloy particles that are present in the drilling fluid composition. This heating allows the melted eutectic metal alloy to flow into voids between the particles in the filter cake. The melted eutectic metal alloy is then cooled, resulting in solidification of the eutectic metal alloy within the filter cake. Molten eutectic metal alloy will slowly equilibrate to the downhole temperature, which is lower than the melting temperature. Once it reaches the temperature below the melting point, it will solidify. The molten eutectic metal alloy may flow from the filter cake into the rock depending on the overbalance pressure, solidifying in the rock to increase the rock strength. As such, disclosed methods may provide efficient strengthening of filter cake and reduction in permeability of the surrounding formation.

A method, 100, in accordance with one or more embodiments of the present disclosure is shown in, and discussed with reference to, FIG. 1. Notably, method 100 may be applied to reduce permeability in high permeability areas of a wellbore. Accordingly, drilling fluid compositions in accordance with one or more embodiments are pumped downhole (step 102) as any conventional drilling fluid composition, resulting in the formation of a filter cake adjacent to the areas of high permeability.

Upon formation of a filter cake in the target zone, the filter cake may be strengthened using the eutectic metal alloy particles, according to one or more embodiments. An external heat source is applied to heat the resulting filter cake (step 104). Suitable external heat sources include, but are not limited to, mineral insulated heaters and thermite heaters. In one or more embodiments, the external heat source is lowered into a wellbore and directed at the filter cake in the target zone. In such embodiments, the external heat source may be connected to topside equipment and lowered into a well using wireline. The length of the wireline may be chosen to enable lowering of the external heat source to a target depth of the well where the target zone is located.

The external heat source is directed at the filter cake (step 104) causing the solid eutectic metal alloy particles that are part of the drilling fluid to melt (step 106). As such, the external heat source may be configured to heat the drilling fluid structure to a temperature ranging from about 45 to 280° C. In one or more embodiments, for example, the external heat source is configured to heat a drilling fluid structure containing eutectic metal alloy particles to a temperature ranging from a lower limit of one of 45, 50, 75, 100, 125, and 150° C. to an upper limit of one of 160, 180, 200, 220, 240, 260, and 280° C., where any lower limit may be paired to any mathematically compatible upper limit. In particular embodiments, the external heat source heats the drilling fluid structure to a temperature ranging from about 100 to about 280° C.

The external heat source may be directed at the drilling fluid structure for a sufficient amount of time to allow the eutectic metal alloy particles to melt. A sufficient amount of time may range seconds to minutes, such as from 5 seconds to 5 minutes, depending on the thermal rock properties and the intensity of the external heat source.

In method 100, the heat from the external heat source melts the eutectic metal alloy particles that are present in the drilling fluid structure to provide liquid eutectic metal alloy (step 106). In one or more embodiments, the liquid eutectic metal alloy flows into voids in the filter cake formed in the wellbore such that the liquid completely fills the voids.

After melting the eutectic metal alloy, the external heat source may be removed from the drilling fluid structure (step 108) and heating discontinued. The external heat source may be removed from the well using the connected wireline. For example, topside equipment may be used to reel in the wireline to efficiently remove the external heat source from the well and thus, allowing the drilling fluid structure containing the liquid eutectic metal alloy to cool and solidify.

Once the external heat source is removed and the drilling fluid structure cools, method 100 includes solidifying the liquid eutectic metal alloy inside the fractures or microfractures of the drilling fluid structure (step 110). As such, method 100 may provide a reinforced filter cake. In one or more particular embodiments, method 100 provides a structure that may act as a well casing. The solidified eutectic metal alloy reinforces the filter cake by cementing the individual particles within the filter cake together to produce a strengthened filter cake.

EXAMPLES

Figure 2:
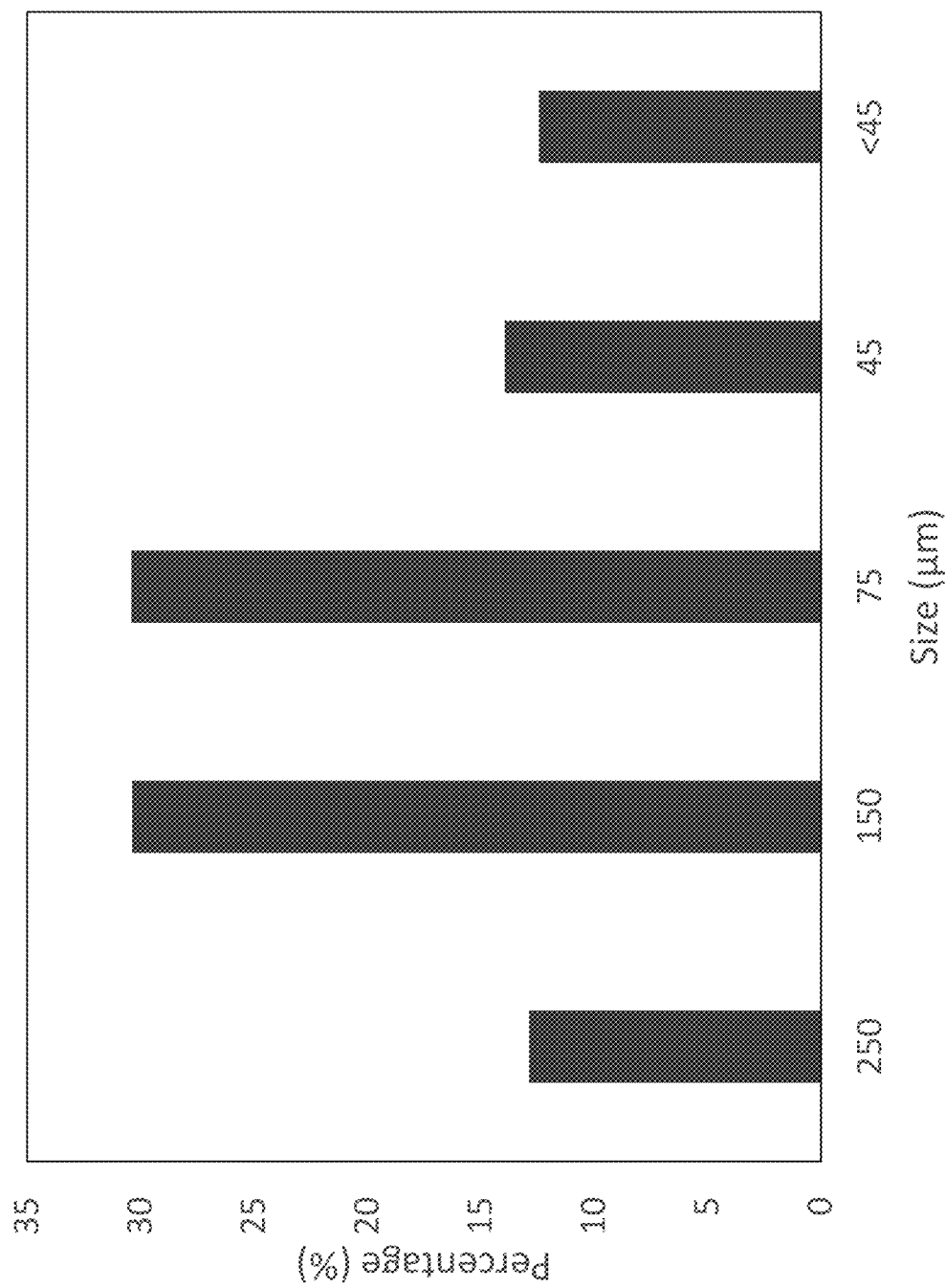
FIG. 2 is a plot of a size distribution of a solid eutectic metal alloy in accordance with one or more embodiments of the present disclosure.

Solid eutectic metal alloy particles, with a melting point of 138° C. were analyzed for particle distribution via dry sieve analysis. Results can be seen in Table 1, below, and FIG. 2.

TABLE 1

Eutectic Metal Alloy Particle Distribution

| Size (μm) | Percentage (%) |
|---|---|
| 250 | 12.87 |
| 150 | 30.36 |
| 70 | 30.40 |
| 45 | 13.93 |
| <45 | 12.44 |

Notably, a finer particle size distribution is more readily suspended in a fluid and less likely to settle, forming an evenly distributed suspension. An evenly distributed suspension of eutectic metal alloy particles is valuable in formulating a fully mixed fluid composition to form an effective filter cake.

A drilling fluid formulation that includes mixed metal oxide (MMO) was prepared including NewGel™ NT bentonite clay viscosifier, GageVis™ MMO cationic viscosifier containing high aspect ratio crystals, water, soda ash, and solid eutectic metal alloy. The composition of the drilling fluid formulation can be seen in Table 2, below.

TABLE 2

Example MMO drilling fluid formulation with eutectic metal alloy.

| Product | Concentration (lbm/bbl) |
|---|---|
| Water | 342.28 |
| NewGel NT | 15 |
| GageVis | 1.5 |
| Soda Ash | 3 |
| Eutectic Alloy | 200 |

Figure 3B:
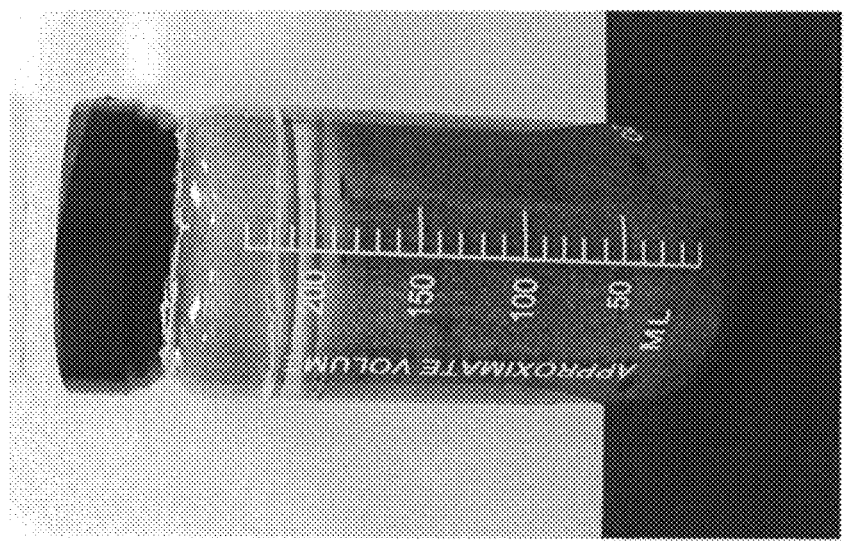
FIGS. 3A and 3B are images of an example drilling fluid in accordance with one or more embodiments of the present disclosure.
Figure 3A:
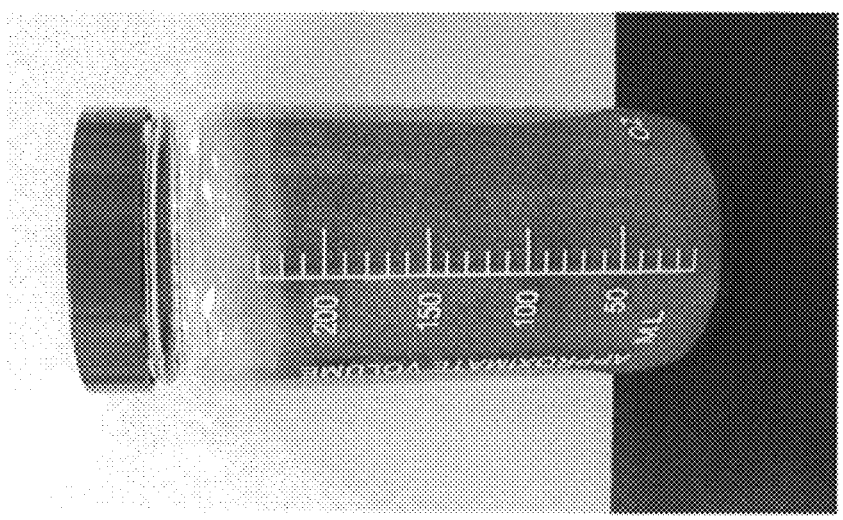

To prepare the example drilling fluid, the mixed metal alloy formulation was hot rolled for 16 hours before any eutectic metal alloy was added. The solid eutectic metal alloy was added and suspended in a mixed metal oxide formulation and then hot rolled for 2 hours at 150° F. The sample was then static aged at 150° F. for 16 hours. The static aging process consists of placing the formulation containing the eutectic metal alloy into a heat aging cell container in a vertical position in a temperature-controlled oven. No settling of the eutectic metal alloy particles was observed. An image of the sample following this process may be seen in FIG. 3A and FIG. 3B. Brookfield viscosity of the resulting fluid was taken before eutectic metal alloy addition, after the addition, and after static aging of the drilling fluid formulations. The viscosity measurements were collected using spindle 64 at 12 rpm for 90 seconds. Results are below in Table 3. [

TABLE 3

Brookfield viscosity of MMO drilling fluid with and without static aging.

| Fluid | Viscosity (centipoise (cP)) |
|---|---|
| Mixed Metal Oxide Drilling Fluid (MMO) | 8,200 |
| MMO Drilling Fluid + 200 lbm/bbl eutectic metal alloy (After mixing) | 10,840 |
| MMO Drilling Fluid + 200 lbm/bbl eutectic metal alloy, Static aged at 150° F. overnight | 6,400 |

The preparation and experimentation procedure was as follows: 200 lbm/bbl of solid eutectic alloy was added to a mixed metal oxide drilling fluid formulation, and the solids were allowed to mix in a mixer at medium speed for 5 minutes. The sample was hot rolled at 150° F. for 2 hours, followed by static aging at 150° F. for 16 hours. The fluid was placed into a high temperature/high pressure (HTHP) cell with a kellundite disk as a filtration medium and a valve to allow for fluid collection. The HTHP cell was heated up to 290° F. with the valve closed, above the melting point of the eutectic metal alloy (280° F.). Once the HTHP cell reached temperature, the fluid was allowed to reach thermal equilibrium over the course of 1 hour.

Figure 4:
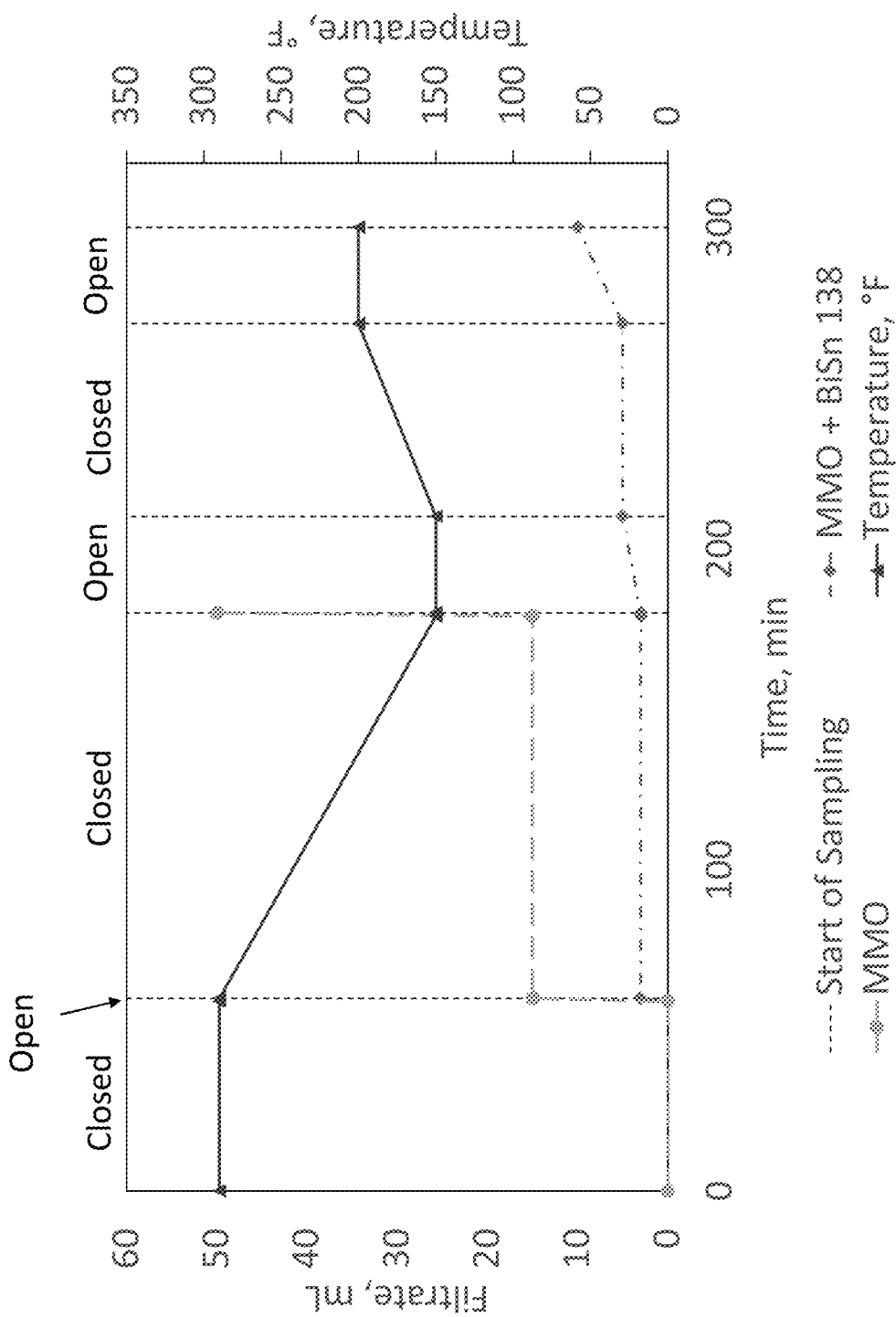
FIG. 4 is a plot of filtration results for an example drilling fluid and a comparative drilling fluid in accordance with one or more embodiments of the present disclosure.

The valve was opened for 5 sec and fluid at 500 psi was collected to ensure that the fluid and the bismuth entered into the pore space of the disk. The valve was then closed, and the HTHP cell was allowed to cool to 150° F. The valve was then opened, and filtrate was collected for 30 minutes at 500 psi. The valve was then shut, and the HTHP cell was heated up to 200° F. The valve was opened again, and filtrate was collected for another 30 minutes at 500 psi. Results can be seen in FIG. 4 and Table 4.

TABLE 4

Fluid loss during filtration with kellundite disk from HTHP cell.

| Step | Temperature (° F.) | Bottom Valve | Time | MMO + Alloy 138 Fluid Loss (mL) | MMO + Alloy 138 Cumulative Filtrate (mL) | MMO (Blank), Cumulative Filtrate (mL) |
|---|---|---|---|---|---|---|
| 1 | 290 | Shut | 60 min | 0 | 0 | 0 |
| 2 | 290 | Open | 60.06 min | 3 | 3 | 15 |
| 3 | 290 to 150 | Shut | ~180 min, cooling | 0 | 3 | 15 |
| 4 | 150 | Open | 210 min | 2 | 5 | >50 |
| 5 | 150 to 200 | Shut | ~270 min, heating | 0 | 5 | No control |
| 6 | 200 | Open | 300 min | 5 | 10 | No control |

Initially, 3 mL of filtrate was collected from the HTHP cell after 1 hour when the MMO system with the eutectic metal alloy was tested, followed by 2 mL of filtrate once the system was allowed to cool to 150° F. An additional 5 mL of filtrate was collected upon heating again to 200° F. This is significantly less than the amount collected when testing the MMO formulation without the eutectic metal alloy. When the MMO formulation without the eutectic metal alloy was tested, there was no control of fluid loss.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A fluid composition comprising:
   a mixed metal oxide viscosifier;
   clay viscosifier; and
   solid eutectic metal alloy particles,
   wherein the fluid composition has a pH in a range of from 7 to 12,
   wherein the solid eutectic metal alloy is present in the fluid composition in an amount that is in a range of about 50 lbm/bbl to about 300 lbm/bbl; and
   wherein the solid eutectic metal alloy particles have an average particles size ranging from 500 nm to 300 microns.

2. The composition of claim 1, further comprising one or more other viscosifiers.

3. The composition of claim 2, wherein the one or more other viscosifiers comprises at least one polymer viscosifier.

4. The composition of claim 1, further comprising one or more lost circulation materials selected from the group consisting of: mineral fiber, inorganic sealants, bridging agents, elastomeric sealants, synthetic fiber, swellable polymer, graphite, and cellulose fibers.

5. The composition of claim 1, wherein the solid eutectic metal alloy particles comprise one or more selected from the group consisting of lead, tin, bismuth, cadmium, and indium.

6. The composition of claim 5, wherein the solid eutectic metal alloy particles comprise bismuth and tin.

7. The composition of claim 1, further comprising one or more pH adjusting agents.

8. The composition of claim 7, wherein the one or more pH adjusting agents comprises soda ash.

9. The composition of claim 1, wherein the fluid composition further comprises an additive selected from the group consisting of anionic suppressants, fluid loss agents, weighted material, and combinations thereof.

10. The composition of claim 1, wherein the composition comprises a fluid loss during filtration of 10 ml/30 min or less when tested at 150° F. and 500 psi.

11. A method comprising:
    pumping a drilling fluid downhole in a wellbore, the drilling fluid comprising:
      water;
      a mixed metal oxide viscosifier;
      a clay viscosifier; and
      solid eutectic metal alloy particles,
      wherein the drilling fluid has a pH in a range of from 7 to 12,
      wherein the solid eutectic metal alloy is present in the fluid composition in an amount that is in a range of about 50 lbm/bbl to about 300 lbm/bbl; and
      wherein the solid eutectic metal alloy particles have an average particles size ranging from 500 nm to 300 microns,
    allowing the drilling fluid to reach a target zone, the target zone being an area of elevated permeability,
    forming a filter cake in the target zone, the filter cake comprising the solid eutectic metal alloy particles,
    heating the filter cake to a temperature greater than a melting temperature of the solid eutectic metal alloy particles, causing the solid eutectic metal alloy particles to at least partially melt and become liquid eutectic metal alloy particles,
    discontinuing heating the filter cake, and
    cooling the filter cake to a temperature lower than the melting temperature of the solid eutectic metal alloy particles, producing a strengthened filter cake.

12. The method of claim 11, further comprising combining the solid eutectic metal alloy particles, the mixed metal oxide viscosifier, the clay viscosifier, and the water to produce the drilling fluid.

13. The method of claim 12, wherein the mixed metal oxide viscosifier is admixed with the water prior to mixing the solid eutectic metal alloy particles.

14. The method of claim 11, wherein the heating is performed using a mineral insulated heater or a thermite heater.

15. The method of claim 11, wherein the solid eutectic metal alloy particles comprise one or more selected from the group consisting of lead, tin, bismuth, cadmium, and indium.

16. The method of claim 15, wherein the solid eutectic metal alloy particles comprise bismuth and tin.

17. The method of claim 11, wherein the melting temperature of the solid eutectic metal alloy particles ranges from 45° C. to 280° C.

18. The method of claim 17, wherein the melting temperature of the solid eutectic metal alloy particles ranges from 100° C. to 280° C.

* * * * *